(12) United States Patent
Rabinowitz (10) Patent No.: US 7,736,007 B2
(45) Date of Patent: Jun. 15, 2010

(54) POLARIZATION LINKAGE OF HIGH DIELECTRIC CONSTANT PIVOTED PLANAR SOLAR CONCENTRATOR MIRRORS

(76) Inventor: Mario Rabinowitz, 715 Lakemead Way, Redwood City, CA (US) 94062

( * ) Notice: Subject to any disclaimer, the term of this patent is extended or adjusted under 35 U.S.C. 154(b) by 123 days.

(21) Appl. No.: 11/969,882

(22) Filed: Jan. 5, 2008

(65) Prior Publication Data

US 2009/0174957 A1    Jul. 9, 2009

(51) Int. Cl.
*G02B 5/10* (2006.01)
*G02B 7/182* (2006.01)
*G03B 21/00* (2006.01)
*F24J 2/38* (2006.01)

(52) U.S. Cl. ............................ 359/853; 359/872; 353/3; 126/600

(58) Field of Classification Search .................. 359/853
See application file for complete search history.

(56) References Cited

U.S. PATENT DOCUMENTS

| | | | |
|---|---|---|---|
| 4,968,355 A | 11/1990 | Johnson | |
| 6,197,228 B1 | 3/2001 | Sheridon | |
| 6,211,998 B1 | 4/2001 | Sheridon | |
| 6,262,707 B1 | 7/2001 | Sheridon | |
| 6,542,283 B1 | 4/2003 | Sheridon | |
| 6,698,693 B2 | 3/2004 | Davidson et al. | |
| 6,957,894 B2 | 10/2005 | Rabinowitz et al. | |
| 6,959,993 B2 | 11/2005 | Gross et al. | |
| 6,964,486 B2 | 11/2005 | Rabinowitz | |
| 6,975,445 B1 | 12/2005 | Rabinowitz | |
| 6,988,809 B2 | 1/2006 | Rabinowitz | |
| 7,077,361 B1 | 7/2006 | Rabinowitz | |
| 7,115,881 B2 | 10/2006 | Rabinowitz | |
| 7,130,102 B2 | 10/2006 | Rabinowitz | |
| 7,133,183 B2 | 11/2006 | Rabinowitz | |
| 7,156,088 B2 | 1/2007 | Luconi | |
| 7,187,490 B2 | 3/2007 | Rabinowitz | |
| 7,192,146 B2 | 3/2007 | Gross et al. | |
| 7,247,790 B2 | 7/2007 | Rabinowitz | |
| 2005/0229924 A1* | 10/2005 | Luconi et al. | 126/696 |
| 2008/0170312 A1* | 7/2008 | Rabinowitz | 359/853 |

FOREIGN PATENT DOCUMENTS

WO    PCT/US02/20199    6/2002

\* cited by examiner

*Primary Examiner*—Stephone B Allen
*Assistant Examiner*—Jade R Callaway (57) ABSTRACT

A highly polarizable high dielectric constant positioning and motion control of the elements (approximately planar mirrors) of a Fresnel reflector solar concentrator tracking heliostat array wherein the elements are suspended with the center of mass above the swivel point, below the swivel point, or have an internal-swivel. The torque to produce angular deflection, and rotational motion is provided by induced and/or permanent dipole coupling to an electronic grid. The force interaction is greatly enhanced by securing a high dielectric material adjacent to each mirror. Thus forces and torques are produced without the use of motors. This allows maximization of solar energy focused by a low-profile concentrator array onto a receiver. Dynamic motion can be controlled over a wide range of dimensions from nanometers to decimeters.

19 Claims, 4 Drawing Sheets

POLARIZATION LINKAGE OF HIGH DIELECTRIC CONSTANT PIVOTED PLANAR SOLAR CONCENTRATOR MIRRORS

FIELD OF THE INVENTION

The instant invention relates generally to a Solar Energy Concentrator Fresnel reflector array that tracks the sun and focuses reflected light by means of greatly augmented induced dielectric dipole alignment of pivoted mirrors. The mirrors may be on a universal pivot that can rotate or tilt in any direction; or on gimbal pivots. By utilization of a high dielectric constant material attached to each mirror, the polarization linkage of the mirror to the alignment grid is greatly increased.

BACKGROUND OF THE INVENTION

This invention provides a better means to achieve affordable solar energy than by a conventional tracking heliostat array. In the latter, enabling the optical elements (mirrors) to be movable generally requires many large heavy motors that consume a great deal of power. This results in an expensive, bulky, and ponderous heliostat that is unfavorable for rooftop and other applications where much weight cannot be tolerated. The present invention functions in solar concentrators and similar equipment much the same as parabolic dish and parabolic trough concentrators, without their disadvantages of bulk and weight. In the instant invention, the angular alignment of the optical elements (mirrors, refractors, lenses, etc.) is accomplished by Induced Dipole Alignment of swiveled mirrors rather than with cumbersome motors. In addition to the induced electric dipole in the metallic conducting part of the mirror, the instant invention greatly augments the metallic mirror dipole moment for rotation of these mirrors by securing a high dielectric constant material that has high dipole polarization coupling to the alignment grid.

DESCRIPTION OF THE PRIOR ART

No prior art was found related to Induced Dipole Alignment of swiveled mirrors that are suspended or supported from their pivot, which mirrors serve as reflecting elements in a Fresnel reflector solar concentrator. The prior art has investigated mirrored ball alignment where the balls are in concentric cavities; and mirrored ball alignment where the balls are between two egg crate like sheets. No prior art was found that utilized induced dipole alignment in electric fields of swiveled mirrors that are vertically stable in a Fresnel reflector solar concentrator, optical switches, displays, or other similar equipment. Nor was any prior art found that utilized the internal-swivel ability of the instant invention to rotate planar mirror disks and similar configurations in place without the need for an affixed or suspended swivel. Furthermore, the instant invention can be operated without need of containment by concentric cavities or an egg crate structure.

The instant invention differs from induced dipole alignment of rotatable mirrors as described and taught in detail in U.S. Pat. No. 6,964,486, "Alignment of Solar Concentrator Micro-Mirrors" by Mario Rabinowitz, issued on Nov. 15, 2005.

Here the dipole is induced in the conducting part of the mirror. The instant invention differs from induced dipole alignment of rotatable mirrors as described and taught in detail in U.S. Pat. No. 7,187,490, "Induced Dipole Alignment Of Solar Concentrator Balls" by Mario Rabinowitz, issued on Mar. 6, 2007. As described in this patent which relates only to balls, the electric dipole is induced in the two hemispheres of a ball within which a mirror is sandwiched. Furthermore, the balls have no external pivot. There are no balls in the instant invention and its mirrors are planar. The instant invention has the novel combination of a high dielectric constant material secured to the mirror, with both being attached to a pivot.

Furthermore, the swiveled structure of the instant invention permits operation with minimal confinement, and if desired can operate in air. Having the swivel point above the mirrors has the additional advantage of vertical stability because the center of mass is below the swivel suspension point. Vertical stability provides a natural fiducial or starting point, as well as enabling simpler and more efficient alignment.

INCORPORATION BY REFERENCE

In a solar energy application (as well as other functions), adjustable reflecting elements are an important feature of a Fresnel reflector solar concentrator which tracks the sun and directs the sunlight to a receiver as described in the following patents and published papers. The following U.S. patents, and Solar Journal publication are fully incorporated herein by reference.

1. U.S. Pat. No. 7,247,790 by Mario Rabinowitz, "Spinning Concentrator Enhanced Solar Energy Alternating Current Production" issued on Jul. 24, 2007.
2. U.S. Pat. No. 7,187,490 by Mario Rabinowitz, "Induced Dipole Alignment Of Solar Concentrator Balls" issued on Mar. 6, 2007
3. U.S. Pat. No. 7,133,183 by Mario Rabinowitz, "Micro-Optics Solar Energy Concentrator" issued on Nov. 7, 2006.
4. U.S. Pat. No. 7,130,102 by Mario Rabinowitz, "Dynamic Reflection, Illumination, and Projection" issued on Oct. 31, 2006.
5. U.S. Pat. No. 7,115,881 by Mario Rabinowitz and Mark Davidson, "Positioning and Motion Control by Electrons, Ions, and Neutrals in Electric Fields" issued on Oct. 3, 2006.
6. U.S. Pat. No. 7,112,253, by Mario Rabinowitz, "Manufacturing Transparent Mirrored Mini-Balls for Solar Energy Concentration and Analogous Applications" issued on Sep. 26, 2006.
7. U.S. Pat. No. 7,077,361, by Mario Rabinowitz, "Micro-Optics Concentrator for Solar Power Satellites" issued on Jul. 18, 2006.
8. U.S. Pat. No. 6,988,809 by Mario Rabinowitz, "Advanced Micro-Optics Solar Energy Collection System" issued on Jan. 24, 2006.
9. U.S. Pat. No. 6,987,604 by Mario Rabinowitz and David Overhauser, "Manufacture of and Apparatus for Nearly Frictionless Operation of a Rotatable Array of Micro-Mirrors in a Solar Concentrator Sheet" issued on Jan. 17, 2006.
10. U.S. Pat. No. 6,975,445 by Mario Rabinowitz, "Dynamic Optical Switching Ensemble" issued on Dec. 13, 2005.
11. U.S. Pat. No. 6,964,486 by Mario Rabinowitz, "Alignment of Solar Concentrator Micro-Mirrors" issued on Nov. 15, 2005.
12. U.S. Pat. No. 6,957,894 by Mario Rabinowitz and Felipe Garcia, "Group Alignment Of Solar Concentrator Micro-Mirrors" issued on Oct. 25, 2005.
13. U.S. Pat. No. 6,843,573 by Mario Rabinowitz and Mark Davidson, "Mini-Optics Solar Energy Concentrator" issued on Jan. 18, 2005.
14. U.S. Pat. No. 6,738,176 by Mario Rabinowitz and Mark Davidson, "Dynamic Multi-Wavelength Switching Ensemble" issued on May 18, 2004.

15. U.S. Pat. No. 6,698,693 by Mark Davidson and Mario Rabinowitz, "Solar Propulsion Assist" issued on Mar. 2, 2004.
16. U.S. Pat. No. 6,612,705 by Mark Davidson and Mario Rabinowitz, "Mini-Optics Solar Energy Concentrator" issued on Sep. 2, 2003.
17. Solar Energy Journal, Vol. 77, Issue #1, 3-13 (2004) "Electronic film with embedded micro-mirrors for solar energy concentrator systems" by Mario Rabinowitz and Mark Davidson.

DEFINITIONS

"Adjustable Fresnel reflector" is a variable focusing planar reflecting surface much like a planar Fresnel lens is a focusing transmitting surface. Heuristically, it can somewhat be thought of as the projection of thin variable-angular segments of small portions of a thick focusing mirror upon a planar surface whose angles can be adjusted with respect to the planar surface.

"Concentrator" as used herein in general is an adjustable array of mirrors for focusing and reflecting light. In a solar energy context, it is that part of a Solar Collector system that directs and concentrates solar radiation onto a solar Receiver.

"Dielectric" refers to an insulating material in which an electric field can be sustained with a minimum power dissipation.

"Dielectric Constant" is the relative static permittivity (or static relative permittivity) of a material as a measure of the extent to which it concentrates electrostatic lines of flux. It is the ratio of the amount of stored electrical energy when an electric field is applied, relative to the permittivity of a vacuum.

"Double Back-To-Back Mirrors" herein shall mean a pair of flat or slightly concave mirrors (in an array of such mirror pairs) that are joined together about a swivel axis so that when the top mirror becomes occluded, the pair can be rotated 180 degrees thus exposing the clean mirror for further usage.

"Electric dipole" refers to the polarization of negative and positive charge. This may be permanent as with electrets, or induced.

"Electric field" or "electric stress" refers to a voltage gradient. An electric field can produce a force on charged objects, as well as neutral objects. The force on neutral objects results from an interaction of the electric field on intrinisic or induced electric polar moments in the object.

"Electrical breakdown" occurs when a high enough voltage or electric field is applied to a dielectric (vacuum, gas, liquid, or solid) at which substantial electric charge is caused to move through the dielectric.

"Electret" refers to a solid dielectric possessing persistent electric polarization, by virtue of a long time constant for decay of charge separation.

"Focusing planar mirror" is a thin almost planar mirror constructed with stepped varying angles so as to have the optical properties of a much thicker concave (or convex) mirror. It can heuristically be thought of somewhat as the projection of thin equi-angular segments of small portions of a thick mirror upon a planar surface. It is a focusing planar reflecting surface much like a planar Fresnel lens is a focusing transmitting surface. If a shiny metal coating is placed on a Fresnel lens it can act as a Fresnel reflector.

"Induced Electric dipole" refers to the polarization of negative and positive charge produced by the application of an electric field.

"Internal-swivel" herein means the ability to rotate in place without the need for an external affixed pivot or swivel. In the instant invention, planar mirror disks, etc. internal-swivel inside hollow concentric cavities when acted on by an external field to cause rotation (e.g. to track the sun).

"Macroscopic electric field" is the applied electric field on the basis of the imposed voltage and the gross (macroscopic) geometry of the electrodes, and which is relevant as long as one is not too near the electrodes.

"Optical elements" are the mirrors, reflectors, focusers, etc. of a concentrator array. As a focuser the optical element may be a lens or include a lens.

"Pyramid or Pyramidal" as used herein refers to a solar collection system in the form of a large base (area) concentrator with three or more sides and a smaller area receiver above the base. In the limit the word Pyramid or Pyramidal includes a truncated cone. The base is a three-dimensional parabolic solar concentrator array that tracks the sun and focuses sunlight onto the receiver.

"Trough" refers to a Fresnel two-dimensional parabolic trough solar concentrator array that tracks the sun and focuses sunlight onto a receiver.

"Swivel" is a pivot or universal joint permitting many degrees of freedom for rotation about the swivel point. As taught in the instant invention, a preferred embodiment is to have the mirrors suspended below the swivel.

"Torr" is a unit of pressure, where atmospheric pressure of 14.7 $lb/in^2$=760 Torr=760 mm of Hg.

"Receiver" as used herein in general such as a solar cell or heat engine system for receiving reflected light. In a solar energy context, it receives concentrated solar radiation from the adjustable mirror assembly for the conversion of solar energy into more conveniently usable energy such as electricity.

SUMMARY OF THE INVENTION

In the Induced High Dielectric Constant Dipole Alignment Adjustable Fresnel Planar Mirror Solar Concentrators that have been developed, the rotatable optical elements (mirrors) can be aligned to concentrate solar energy on a receiver having dimensions small compared to the dimensions of the array. This permits the focal point of the array to remain focused on the receiver over the course of a day and throughout the year. The swivel point for rotation is located above the mirrors, giving the additional advantage of vertical stability. Vertical stability provides a natural fiducial or starting point, as well as enabling simpler and more efficient alignment. At startup for initial operation, or following a blackout, having the swivel point affixed above the mirrors gives them a natural quasi-vertical position since the center of mass of the mirrors is below the swivel suspension point. A given natural angle with respect to the vertical can be built in to the mirrors by weight distribution and/or constructing the mirrors with a cocked angle relative to their support stem. Such quasi-vertical positioning allows the mirrors to start from a nearly aligned position, rather than having to move over a much larger angle for alignment. Furthermore, the natural stability of a quasi-vertical position [as opposed to the natural stability of a quasi-horizontal position when the swivel point is below the mirrors] permits a substantial reduction in the latching force required to hold the mirrors in alignment between alignment operations.

Receivers, such as photovoltaic cells, convert the solar energy focused and delivered to them by the solar concentrator directly into electrical energy or via heat engines (e.g. Stirling cycle engines) which convert the solar energy into mechanical energy which can be used directly, or indirectly converted to electricity. This invention provides an increased force positioning system by means of high dielectric materials, to overcome friction and to allow for the use of smaller positioning electric fields.

There are many aspects and applications of this invention, which provides techniques applicable individually or in combination as an actuator, for motion control, and for positioning of the optical elements of a solar concentrator and similar equipment. The instant invention can perform dynamic motion control over a wide range of dimensions from nanometers to decimeters, i.e. from the nano-range, through the micro-range, through the mini-range to the macro-range. A broad general concept of this invention relates to Induced High Dielectric Constant Dipole Alignment for the actuation, motion production and control, and positioning of planar optical elements. Optical elements such as mirrors are normally made of a conductive metallic coating. In an applied electrostatic field, E, a dipole moment is induced in the metallic conducting material of swiveled-mirrors because the charge distributes itself so as to produce a field free region inside the conductor. To internally cancel the applied field E, free electrons move to the end of each conducting mirror antiparallel to the direction of E, leaving positive charge at the end that is parallel to the direction of E. Another way to think of this in equilibrium is that a good conductor cannot long support a voltage difference across it without a current source. Furthermore, an electrostatic field polarizes and aligns any dielectric associated with a mirror. The mirror has a high aspect ratio of diameter to thickness. Similarly the transparent dielectric part of the mirror has a high aspect ratio of diameter to thickness. An induced electrostatic dipole in a swiveled conductor in an electrostatic field is somewhat analogous to an induced magnetic dipole in a swiveled ferromagnetic material in a magnetic field, which effect most people have experienced. When swiveled, a high aspect ratio (length to thickness ratio) ferromagnetic material rotates to align itself parallel to an external magnetic field. Another aspect of the instant invention is that the same alignment technique can be done magnetically with an induced magnetic dipole in mirrors made of ferromagnetic material and/or an attached permanent dipole.

Although the primary application of the instant invention is for a solar concentrator application, there are a number of other applications such as mirrored illumination and projection, optical switching, solar propulsion assist, etc.

In the adjustable Fresnel reflectors solar concentrator with induced dipole alignment of swiveled mirrors that has been developed, the induced dipole aligns the optical elements to concentrate solar energy on a receiver having dimensions small compared to the dimensions of the array. This permits the focal point of the array to remain focused on the receiver over the course of a day and throughout the year.

Receivers, such as photovoltaic cells, convert the solar energy focused and delivered to them by the solar concentrator directly into electrical energy or via heat engines (e.g. Stirling cycle engines) which convert the solar energy into mechanical energy which can be used directly, or indirectly converted to electricity.

There are many aspects and applications of this invention, which provides techniques applicable individually or in combination as an actuator, for motion control, and for positioning of the optical elements of a solar concentrator and similar equipment. The broad general concept of this invention relates to motorless actuation, motion production and control, and positioning. The instant invention can perform dynamic motion control over a wide range of dimensions from nanometers to centimeters, i.e. from the nano-range, through the micro-range, through the mini-range to the macro-range in a broad scope of applications in micro-electro-mechanical systems (MEMS) such as a solar concentrator, and in similar equipment such as optical switching to macro-positioning. Motorless angular deflection, and continuous rotation are achieved without recourse to magnetic fields thus eliminating the need for coils. Furthermore, the instant invention permits less costly and greater ease of manufacture while providing well-defined motion and position control.

It is a general aspect of this invention to provide a dynamic system for motion control of an optical system.

Another general aspect of this invention is to provide a positioning system of an optical system.

Another general aspect of this invention is to provide an increased force positioning system by means of high dielectric materials.

Another aspect of this invention is provide a natural stable position of the mirrors by locating the swivel above the mirrors.

Another aspect of the instant invention provides a reduction in the latching force required to hold the mirrors in alignment between alignment operations.

Another aspect of this invention is to provide an actuator for an optical system.

Another aspect of this invention is to provide the motive force for an optical system.

Another aspect of the instant invention is to produce motorless motion of the elements of a solar concentrator.

Another aspect of this invention is to cause motorless angular deflection of the elements of a solar concentrator.

An aspect of the invention is to produce motorless continuous rotation of the elements of a solar concentrator.

An aspect of this invention is to produce motorless rotation of the elements of a solar concentrator with the ability for smooth stopping.

Other aspects and advantages of the invention will be apparent in a description of specific embodiments thereof, given by way of example only, to enable one skilled in the art to readily practice the invention singly or in combination as described hereinafter with reference to the accompanying drawings. In the detailed drawings, like reference numerals indicate like components.

GLOSSARY

The following is a glossary of components and structural members as referenced and employed in the instant invention with like reference alphanumerics indicating like components:
1—rotatable optical element (includes mirror)
2—mirror
3—incident light
4—Fresnel concentrator
5t—top of a grid compartment
5b—bottom of a grid compartment
5—pyramidal concentrator and receiver system
6'—Support rod
7—concentrator modules
8—swivel support bearing (hold swivel or pivot)
8'—backing dielectric (as in FIG. 1g)
9—universal swivel that can rotate or tilt in any direction
16—receiver (receives or collects light e.g. solar cell, Stirling cycle heat engine, etc.)
17—sheet (contains optical elements within it)
18—lubricating fluid
19—concentric cavity
20—transparent dielectric material (such as glass or plastic)
22—high dielectric constant material
24—resistive grid wires
30—reflected light (in FIG. 1i, it is also incident light)
44—electronic control grid (in perspective)
45—transparent sheet on top of grid
100—Sun
102—concentrator modules (for trough concentrator)
104—trough concentrator
106—enclosure for trough receiver
107—trough receiver (receives or collects light e.g. solar cell, Stirling cycle heat engine, etc.)
E—electric field
V1, V2, V3, V4—voltage (number next to V indicates grid voltage location)
+—positive charge
—negative charge

DETAILED DESCRIPTION OF THE PRESENTLY PREFERRED EMBODIMENTS

As is described here in detail, the objectives of the instant invention may be accomplished by any of a number of ways separately or in combination, as taught by the instant invention. A tracking solar concentrator has been developed in which the orientation of individual optical elements (mirrors, reflectors, lenses) is accomplished by electric dipole interaction between the electric field of a grid and an induced dipole, and/or an electret dipole, to align them consecutively or concurrently without the need for expensive, bulky, and heavy motors. Thus the improved solar concentrator of the instant invention can be less expensive, more reliable, and lighter in weight than conventional solar arrays.

Figure 1A:
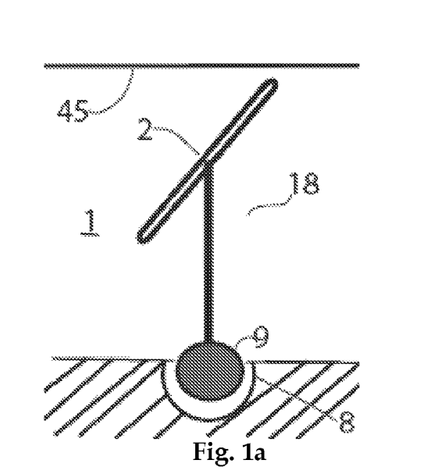
FIG. 1a is a cross-sectional side view of a mirror supported beneath by a universal swivel (pivot) as one optical element of an adjustable Fresnel reflector solar concentrator.

FIG. 1a is a cross-sectional side view of a mirror 2 supported underneath by a universal swivel (pivot) 9 that is in a supporting swivel bearing 8, as one optical element 1 of an adjustable Fresnel reflector solar concentrator. The element 1 is immersed in a transparent dielectric fluid 18 which serves both as a lubricant and to increase dielectric strength i.e. the breakdown voltage.

Figure 1B:
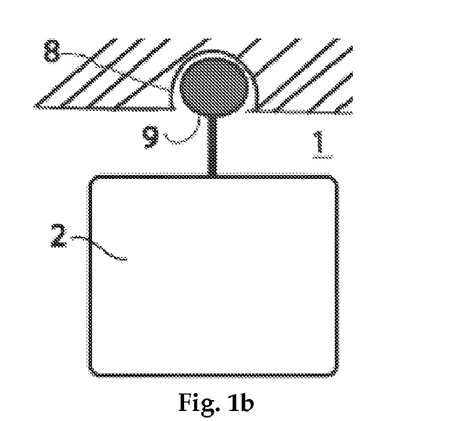
FIG. 1b is a cross-sectional front view of a suspended rectangular mirror that is on an overhead universal swivel as one optical element of an adjustable Fresnel reflector solar concentrator.

FIG. 1b is a front cross-sectional view of an inverted rectangular planar or slightly concave optical element 1 that consists of a mirror 2 suspended from a universal swivel 9 that can rotate or tilt in any direction, supported by a swivel bearing 8. This is one member of an adjustable Fresnel reflector solar concentrator array. The mirror can be flat or slightly concave. The advantage of overhead suspension with the swivel and bearing above the center of mass of each element is that it provides natural vertical stability to said optical elements. Alignment can be achieved by an Induced Dipole Force.

Figure 1C:
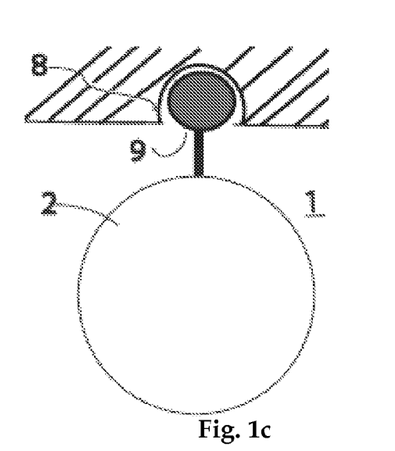
FIG. 1c is a cross-sectional front view of a suspended circular mirror that is on an overhead universal swivel as one optical element of an adjustable Fresnel reflector solar concentrator.

FIG. 1c is a front cross-sectional view of an inverted circular planar or slightly concave optical element 1 composed of a mirror 2 suspended from a universal pivot (swivel) 9 that can rotate or tilt in any direction, supported by a swivel bearing 8. This is one member of an adjustable Fresnel reflector solar concentrator array. The mirror can be flat or slightly concave. Alignment is achieved by an Induced Dipole Force.

Figure 1D:
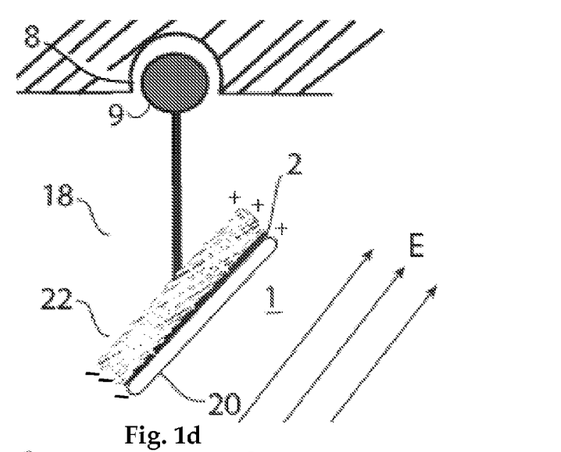
FIG. 1d is a cross-sectional side view of a mirror suspended from an overhead universal swivel, that is one optical element of an adjustable Fresnel reflector solar concentrator. Adjacent to the back of the mirror is a high dielectric constant material. Adjacent to the front of the mirror is a high dielectric constant material, consistent with the need for it to be transparent. The mirror and dielectrics have been polarized and aligned by the applied electric field E.

FIG. 1d is a cross-sectional side view of a planar or slightly concave mirror 2 suspended from an overhead universal swivel, that is one optical element 1 of an adjustable Fresnel reflector solar concentrator. Adjacent to the back of the mirror is a high dielectric constant material 22. Adjacent to the front of the mirror is a high dielectric constant material 20 such as glass or plastic, consistent with the need for it to be transparent. The mirror and dielectrics have been polarized as indicated by the + and − signs, and aligned by the applied electric field E. An electret (which is the electrostatic analogue of a magnet) may be sandwiched between the dielectric material 22 and the mirror 2 to further enhance the net dipole field.

The instant invention operates by induced dipole alignment such that the dipole that is induced in the high aspect ratio (length to thickness ratio) dielectric material adjacent to a mirror acts in harmony with the induced dipole in each mirror. An external applied electric field E induces a dipole by polarizing the dielectric to partially cancel the field E inside the dielectric. In an applied electrostatic field, E, a dipole moment is induced in the metallic conducting material of the micromirrors because the charge distributes itself so as to produce a field free region inside the conductor. To internally cancel the applied field E, free electrons move to the end of each conducting mirror antiparallel to the direction of E, leaving positive charge at the end that is parallel to the direction of E. The electrostatic field induces and aligns the electrostatic dipoles of the dielectric and mirrors in a way somewhat analogous to an induced magnetic dipole in a pivoted ferromagnetic material in a magnetic field. When pivoted, a high aspect ratio (length to thickness ratio) ferromagnetic material becomes polarized and rotates to align itself parallel to an external magnetic field. Similarly an electrostatic field polarizes and aligns each dielectric ball and mirror. The mirror has a high aspect ratio of diameter to thickness.

Thus the instant invention provides an increased force positioning system by means of high dielectric materials, to overcome friction and to allow for the use of lower positioning electric fields. The permittivity (directly related to dielectric constant) of the dielectric material is analogous to the permeability of a ferromagnetic material. The higher both are, the larger the induced dipole in the corresponding field and the larger the rotational torque which is the vector product of the net dipole moment and the applied field. A high dielectric constant material of low mass density is preferred as there is a volume aspect to the torque that tends to cancel the volume of the material leaving the angular acceleration approximately proportional to the density of the rotated element. For those materials that are transparent, the dielectric constant is approximately equal to the square of the index of refraction.

The following Table of High Dielectric Constant Materials indicates a wide range of materials than can be used. Highly polarizable material in the context of the instant invention can be any of the materials listed below, and preferably has a dielectric constant greater than 4. Since the index of refraction, n, is approximately equal to the square root of the dielectric constant, n is preferably greater than 2. Liquids are included as they could easily be encapsulated and generally are of low density.

Table of High Dielectric Constant Materials

| Dielectric | Dielectric Constant |
| --- | --- |
| Glass | 3.7-10 |
| Silicon Dioxide | 3.7 |
| Paper | 3.5 |
| Electroactive Polymers | 2-12 |
| Concrete | 4.5 |
| Rubber | 7 |
| Diamond | 5.5-10 |
| Silicon | 11.7 |
| Methanol | 30 |
| Furfural | 42 |

-continued

Table of High Dielectric Constant Materials

| Dielectric | Dielectric Constant |
| --- | --- |
| Glycerol | 47-68 |
| Water | 34-88 |
| Formamide | 84 |
| Titatium Dioxide | 86-173 |
| Strontium Titanate | 310 |
| Barium Strontium Titanate | 15-500 |
| Polymer Composites | >1000 |
| (La,Nb):(Zr,Ti)PbO$_3$ | 500-6000 |
| Barium Titanate | 90-10,000 |
| Conjugated Polymers | 6-100,000 |

Figure 1E:
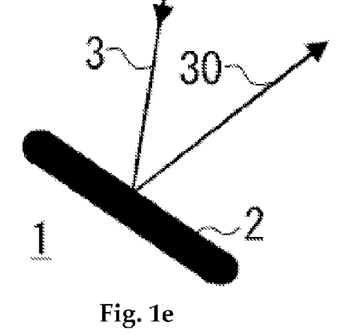
FIG. 1e is a cross-sectional view of a circular metal conducting disk that is a highly reflecting mirror. This element is one of a multitude of optical elements which can track a light source and focus a concentrated light beam onto a receiver.

FIG. 1e is a cross-sectional side view of a circular metal conducting disk that is a highly reflecting mirror 2. This element 1 can have an over head pivot point, or an underneath pivot point, or an internal pivot point. The element 1 is one of a multitude of optical elements which can track a light source and focus a concentrated light beam onto a receiver. The angle of incidence of the incident light 3 is equal to the angle of reflection of the reflected light i.e. there is specular reflection.

Figure 1F:
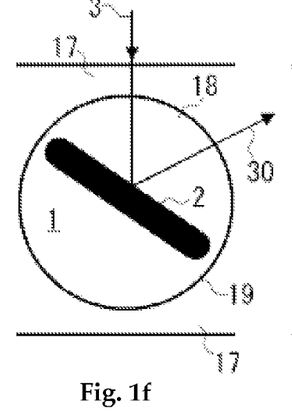
FIG. 1f is a cross-sectional view of a circular metal conducting disk that is a highly reflecting mirror. This element is encapsulated in a lubricated spheroidal cavity, and is one of a multitude of optical elements which can track a light source and focus a concentrated light beam onto a receiver.

FIG. 1f is a cross-sectional side view of a circular metal conducting disk that is a highly reflecting mirror 2. This element 1 is encapsulated in a lubricated spheroidal cavity 19, containing lubricant 18, all of which are inside a sheet 17. This element 1 is one of a multitude of optical elements which can track a light source and focus a concentrated light beam onto a receiver.

Figure 1G:
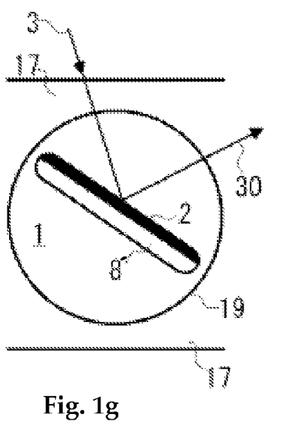
FIG. 1g is a cross-sectional view of a circular metal conducting disk that is a highly reflecting mirror on top of a dielectric disk. This element is encapsulated in a lubricated spheroidal cavity, and is one of a multitude of optical elements which can track a light source and focus a concentrated light beam onto a receiver.

FIG. 1g shows a cross-sectional side view of a circular disk rotatable optical element 1 with a circular disk mirror 2 on the top of a dielectric 8', that is completely encompassed with a lubricating fluid 18 which is encapsulated inside a concentric cavity 19 in sheet 17'. The backing dielectric 8' is present to give the mirror 2—rigidity if the mirror is made of a highly reflective thin film such as Aluminum or Chromium. When the dielectric 8' has a high dielectric constant, it helps greatly in the alignment process as explained in conjunction with FIG. 1d. The backing may also be metallic, though a dielectric backing is preferred because of its lower mass density and lower cost. Also shown is the incident light ray 3 and the reflected light ray 30. Alignment is achieved by Induced Dipole Force.

Figure 1H:
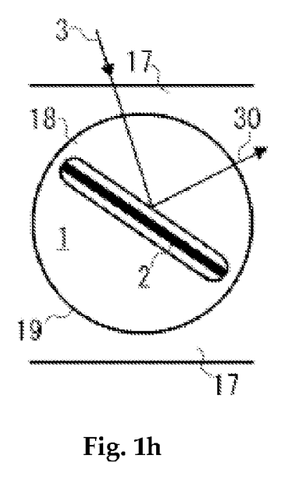
FIG. 1h is a cross-sectional view of a circular disk with an internal reflecting mirror sandwiched between two dielectric disks. This element is encapsulated in a lubricated spheroidal cavity, and is one of a multitude of optical elements that can track a light source and focus a concentrated light beam onto a receiver.

FIG. 1h is a cross-sectional view of a circular disk rotatable optical element 1 with an internal reflecting mirror sandwiched between two dielectrics with rounded edges. The element 1 is completely encompassed with a lubricating fluid 18 which is encapsulated inside a concentric cavity 19 in sheet 17'. Also shown is the incident light ray 3 and the reflected light ray 30. This element is one of a multitude of optical elements that can track a light source and focus a concentrated light beam onto a receiver. Smooth stopping is an advantage naturally built into the operation of all the planar mirror dipole embodiments. The torque is proportional to the vector cross product of the dipole moment, applied electric field E, and sine of the angle between the vector dipole moment and the vector E. Thus the torque automatically goes to zero as a mirror aligns itself with the applied electric field. Alignment is achieved by means of an Induced Dipole Force.

A magnetic interaction that is analogous to the electrostatic interaction can also be used. A magnet can replace an electret, a shiny ferromagnetic material can function as a mirror to replace the conducting mirror material, a high permeability backing (that need not be shiny) can replace the high dielectric constant material, and an applied magnetic field can replace the applied electrostatic field. The torque would then result from the vector product of the total magnetic dipole and the magnetic field.

Figure 1I:
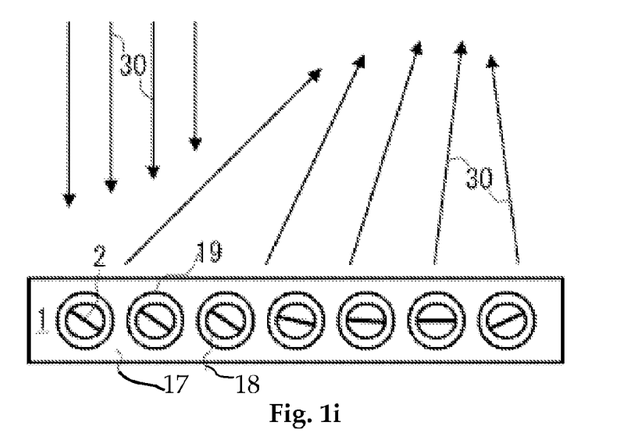
FIG. 1i is a cross-sectional view of an ensemble of micromirrors encapsulated in lubricated cavities in a micro-optics concentrator. These micro-mirrors internal-swivel in rotation so they can focus incident light onto a receiver.

FIG. 1*i* is a cross-sectional view of a concentrator comprising an ensemble of elements 1 containing micro-mirrors 2 encapsulated in lubricant 18 inside spherical cavities 19 in a sheet 17. These micro-mirrors 2 are thus rotational with minimal friction, so they can focus incident light with concentrated reflected light 30 onto a receiver 9. Alignment is achieved by means of an Induced Dipole Force.

Figure 2A:
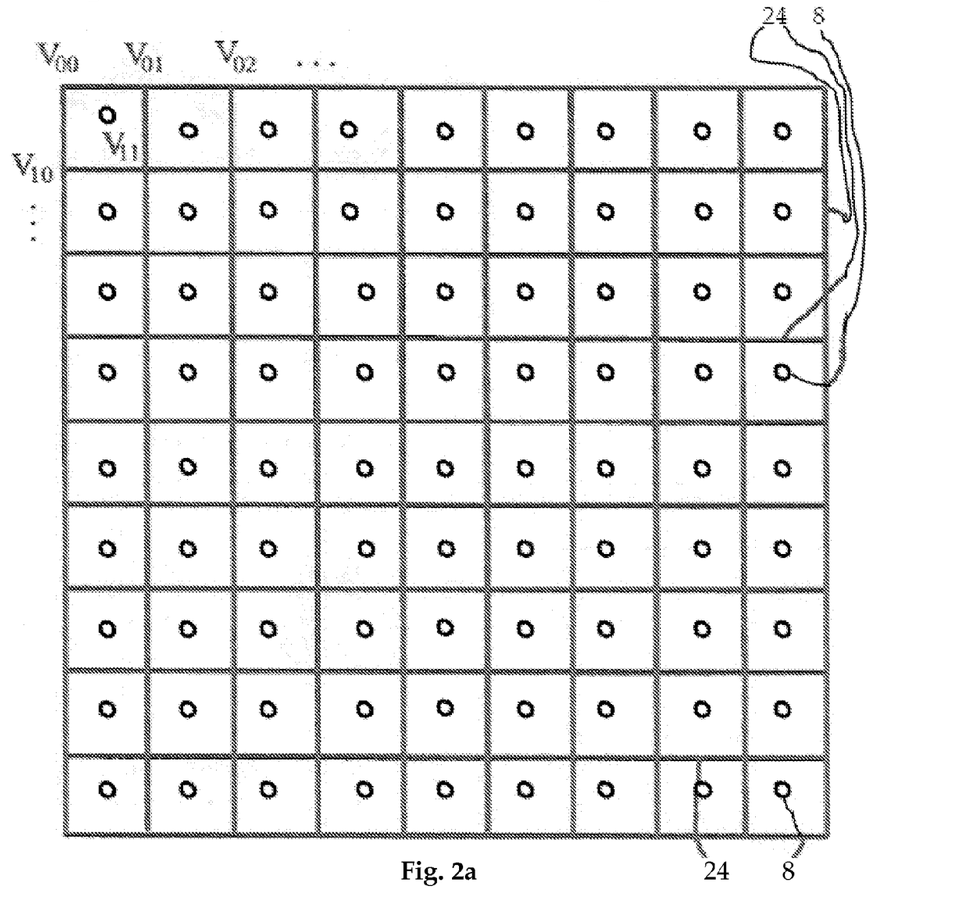
FIG. 2a is a schematic top view showing a generic electronic control grid that may represent a number of different kinds of transistorless grids; or grids with transistors at junctions, for matrix addressing and alignment of the optical elements of a solar concentrator or other similar optical equipment. Also shown schematically are the swivel bearings of the transparent material that supports the mirrors and the grid.

FIG. 2*a* is a schematic top view showing an electronic control grid with resistive grid wires 24 for either passive or active addressing matrix addressing and alignment of the optical elements of a solar concentrator or other similar optical equipment. Also shown schematically are the swivel bearings 8 which support the swivels (described earlier with swivels designated as 9). The term "equipment" is used in the instant invention to stand for Solar Energy Concentrators which may be of the Fresnel reflector type, or other types of equipment requiring addressing and alignment, such as optical switches and display equipment. This grid can be laid on the bottom of the equipment, on the top and bottom of the equipment, on the top of the equipment with a ground plane on the bottom of the equipment, etc. In order to avoid having several similar looking figures, this schematic may be thought of as a representation of any one of several addressing grid arrays. It can be a passive matrix wire grid array with one set of parallel wires on top of the equipment, separated and insulated from an orthogonal set of wires (that are parallel to each other) on the bottom of the equipment. Alternatively it can be an actual interconnected active matrix grid with Thin Film Transistors (TFTs), tunneling junction transistors (as used in flash memories), or similar devices at each of the grid junctions. In this case it is preferable to use Polymer based transistors for flexibility. The grid may be a segmented array with each square being a separate insulated slab (cf. to U.S. Pat. No. 6,964,486). In this case, the horizontal and vertical lines shown in this figure represent insulation between adjacent segments or slabs. The common element of all of these embodiments is the ability to impress the voltage Vij at the ij-th node either statically or by means of a traveling wave. To minimize power dissipation, it is desirable to make the grid electrodes (edges) that delineate the grid compartments such as 5*t* and 5*b* of FIGS. 2*b*, and 2*c* highly resistive so that a given voltage drop is accomplished with a minimum of current flow and hence with a minimum of power dissipation. The bus bars that bring the voltage to the grid electrodes may have a higher conductivity (lower resistance).

Figure 2B:
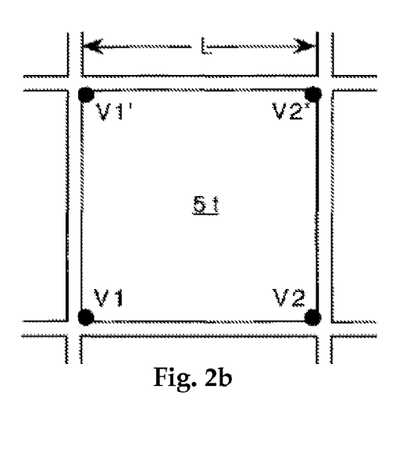
FIG. 2b is a schematic top view of an array of partitioned highly resistive electrodes showing in detail a top electrode of an electronic control grid for rotating the reflecting elements of a solar concentrator or other similar optical equipment. This schematic can represent either passive or active addressing as will be explained in the detailed description.

FIG. 2*b* represents a top view of an array of grid compartments with grid spacing L showing in detail a top view of one such top grid compartment 5*t* and the voltages at its four corners V1, V2, V1' and V2'. Voltages V1 and V2 correspond to voltages V1 and V2 shown in the cross sectional FIGS. 3*a*, 3*b*, 3*c*, and 3*d*. Voltages V1' and V2' are the voltages at the corners of this top of grid compartment 5*t* below the plane of the paper. Each grid electrode is made of a highly resistive thin conductor which hardly occludes light.

A magnetic interaction that is analogous to the electrostatic interaction can also be used. A magnet can replace an electret, a shiny ferromagnetic material can function as a mirror to replace the conducting mirror material, a high permeability backing (that need not be shiny) can replace the high dielectric constant material, and an applied magnetic field can replace the applied electrostatic field. The torque would then result from the vector product of the total magnetic dipole and the magnetic field.

Figure 2C:
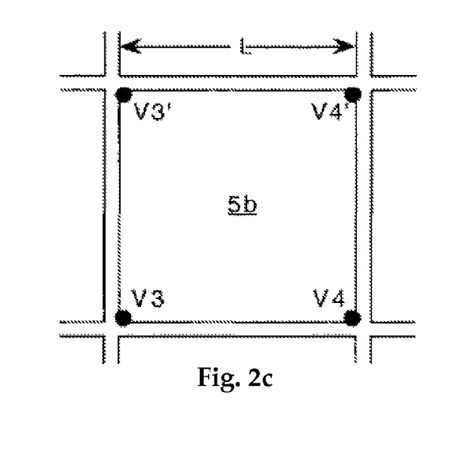
FIG. 2c represents a bottom view of an array of partitioned highly resistive electrodes showing in detail a view of a bottom electrode and the voltages at its four corners.

FIG. 2*c* represents a bottom view of an array of grid compartments delineated by highly resistive electrodes with grid spacing L showing in detail a view of a bottom electrode 5*b* and the voltages at its four corners V3, V4, V3' and V4'. Voltages V3 and V4 correspond to voltages V3 and V4 shown in the cross sectional FIGS. 3*a*, 3*b*, 3*c*, and 3*d*. Voltages V3' and V4' are the voltages at the corners of this bottom electrode 5*b* below the plane of the paper.

An magnetic interaction that is analogous to the electrostatic interaction can also be used. A magnet can replace the electret, a shiny ferromagnetic material can function as a mirror to replace the conducting mirror material, and an applied magnetic field can replace the applied electrostatic field. The torque would then result from the vector product of the total magnetic dipole and the magnetic field.

Figure 2D:
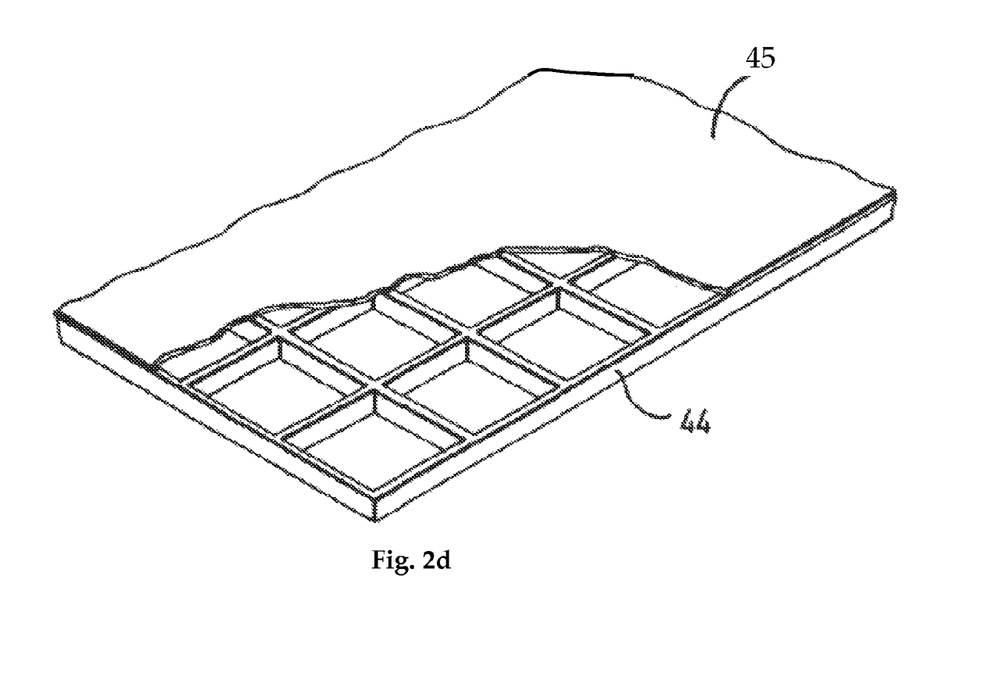
FIG. 2d is a cut-away perspective of a schematic control grid showing a transparent sheet on top of the grid.

FIG. 2*d* is a cut-away perspective of a schematic electronic control grid 44 showing a transparent sheet 45 on top of the grid 44. The sheet 45 performs at least three functions. The primary function of the transparent sheet 45 is to house the swivel bearings 8 shown in FIGS. 1*a*, 1*b*, 1*c*, 1*d* and 2*a*, which in turn support the universal swivels 9. The bearings 8 and swivels 9 are not shown in this FIG. 4*d* to keep this figure uncluttered in showing just the voltage carrying electronic grid 44, and the transparent sheet 45; and because this configuration also applies to the internal-swivel embodiments. The sheet 45 also protects the optical elements (mirrors), and permits an uninterrupted duty cycle of the concentrator, as the grimy, formerly fully transparent sheet can be cleaned, while the mirrors continue to perform their duty. The sheet 45 also functions to seal in a fluid such as vacuum, oil, elevated pressure gas, etc. to provide lubrication, and to increase the dielectric strength (breakdown voltage) of the grid/optical element ensemble. This is explained in the *McGraw-Hill Encyclopedia of Science & Technology*, article on Electrical Insulation by Mario Rabinowitz in any of the editions from 1982-20002.

Figure 3A:
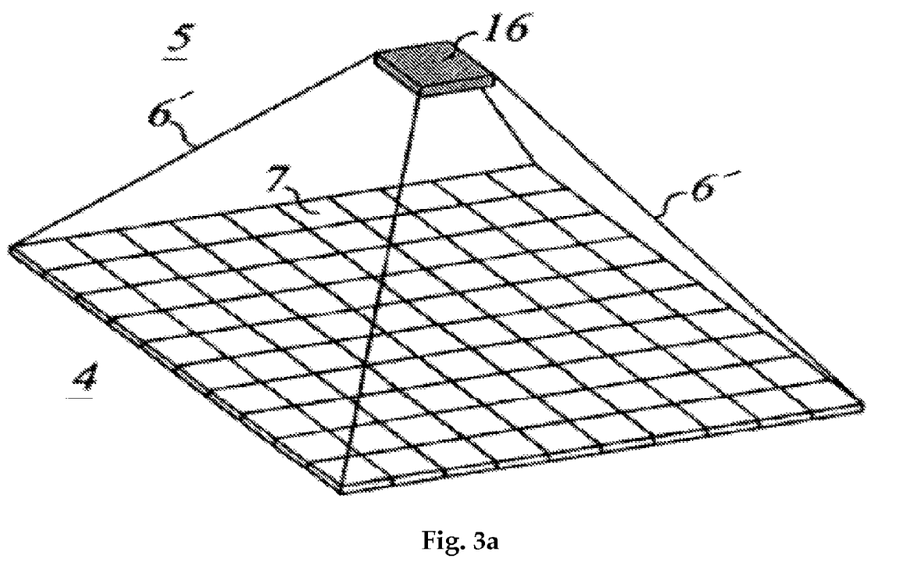
FIG. 3a is a perspective illustration of a Fresnel pyramidal three-dimensional parabolic solar concentrator array that tracks the sun and focuses sunlight onto a receiver.

FIG. 3*a* is a perspective view of a pyramidal configuration solar collection system 5 consisting of a Fresnel reflector concentrator 4 and receiver 16 above it, supported by rods 6'. When the receiver 16 is a solar photovoltaic receiver, the rods 6' can serve as conduits for electrical wiring to and from the receiver 16. The Fresnel reflector concentrator 4 may be a single large monolithic configuration, or as shown, it is preferably made up of separate modules 7 which are fastened together and secured to an existing surface such as the ground. This facilitates maintenance and repair operations when needed. Thus it is only necessary to remove one or more modules that need to be worked on, rather than disabling the entire concentrator 4. The ensemble of mirrors and confining sheets may be replaced, while retaining the addressing electronics system. Furthermore this modular design also allows the concentrator 4 to be built up easily to increase the concentration factor. Another advantage of this modular design is that the separate modules 7 can be much more easily transported from the factory to the installation site, than would a large monolithic concentrator.

The pyramidal configuration solar collection system 5' can be scaled from micro size to macro size. The limit on smallness (e.g. millimeters) is determined by the smallness of the optical elements (mirrors), with a correspondingly small receiver 16. Small units may be operated together as a system. The macro limit may be in the hundreds meters with structural and economic limits determining the maximum size of a given large unit. For practicality of an overall large system, many modular medium sized units would be preferable.

The concentrator 4 may be secured to the ground or any existing structure such as a roof, side of a building, etc. It is desirable to give the solar collection system 5 a small incline for a number of reasons including gravitational removal of water that may collect on it. This can be done on both flat and inclined roof tops without the growth of vegetation under it. However on the ground, it is preferable to have the system 5' immediately adjacent to the ground to prevent growth of vegetation under it. This can be accomplished by grading of the ground slope prior to installation of the solar collection system 5.

The pyramidal solar collection system 5 is a preferred embodiment when the concentration factor is roughly >10× and substantial forces of nature such as storms and earthquakes may be encountered. The receiver 16 is perched approximately above the center of the concentrator, with the rods making a roughly 45 degree angle with respect to the concentrator. This is an approximately desirable position and angle, but not critical.

Figure 3B:
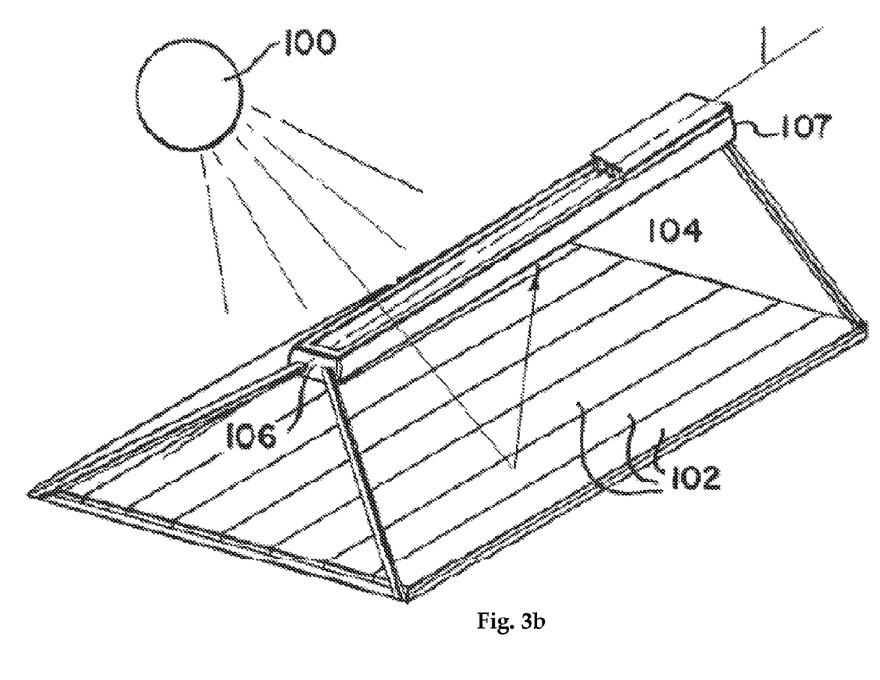
FIG. 3b is a perspective illustration of a Fresnel two-dimensional parabolic trough solar concentrator array that tracks the sun and focuses sunlight onto a receiver.

FIG. 3b is a perspective illustration of a Fresnel two-dimensional parabolic trough solar concentrator and receiver system consisting of Fresnel reflector concentrator modules 102 and receiver 107 above them, for concentrating light from the Sun 100 to the receiver 107 with enclosure 106. The Fresnel reflector concentrator 104 may be a single large monolithic configuration, or as shown, it is preferably made up of separate modules 102 which are fastened together and secured to an existing surface such as the ground. Since the trough concentrator has only 1-axis tracking, the elements and mirrors can be cylindrical with only one axis of rotation. This facilitates maintenance and repair operations when needed. Thus it is only necessary to remove one or more modules that need to be worked on, rather than disabling the entire concentrator 4. The modules can contain mirrors such as illustrated in FIG. 2c. The ensemble of mirrors and confining sheets may be replaced, while retaining the addressing electronics system. Furthermore this modular design also allows the concentrator 104 to be built up easily to increase the concentration factor. Another advantage of this modular design is that the separate modules 102 can be much more easily transported from the factory to the installation site, than would a large monolithic concentrator. It is desirable to give the concentrator 104 a small incline for a number of reasons including gravitational removal of water that may collect on it. On the ground, it is preferable to have the concentrator 104 immediately adjacent to the ground to prevent growth of vegetation under it. This can be accomplished by grading of the ground slope prior to its installation.

The trough configuration solar collection system can be scaled from micro size to macro size. The limit on smallness (e.g. millimeters) is determined by the smallness of the optical elements (mirrors), with a correspondingly small receiver 107. Small units may be operated together as a system. The macro limit may be in the hundreds meters with structural and economic limits determining the maximum size of a given large unit. For practicality of an overall large system, many modular medium sized units would be preferable.

SCOPE OF THE INVENTION

While the instant invention has been described with reference to presently preferred and other embodiments, the descriptions are illustrative of the invention and are not to be construed as limiting the invention. Thus, various modifications and applications may occur to those skilled in the art without departing from the true spirit and scope of the invention as summarized by the appended claims together with their full range of equivalents. It is to be understood that in said claims, ingredients recited in the singular are intended to include compatible combinations of such ingredients wherever the sense permits. It should be recognized that the methods and apparatus of this invention can be used in other contexts than those explicitly described herein. It is also to be understood that the following claims are intended to cover all of the generic and specific features of the invention herein described, and all statements of the scope of the invention which, as a matter of language, might be said to fall there between.

The invention claimed is:

1. A solar concentrator system comprising
   a) an array of adjustable approximately planar optical elements containing mirrors and highly polarizable dielectric material;
   b) said polarizable dielectric material rigidly joined to said mirrors;
   c) each of said elements supported by at least one pivot;
   d) said polarizable dielectric material coupled to dipole coupling devices;
   e) said devices producing a propelling force;
   f) said force producing an alignment of said optical elements to track sunlight;
   g) said dipole coupling device consisting of at least one of the group consisting of induced dielectric dipole coupling and permanent electret dipole coupling;
   h) dipole linkage to rotate dipolar elements;
   i) dipolar elements coupled to an electronic control grid;
   j) said control grid activated by a processor; and
   k) a receiver for energy conversion of light concentrated by said solar concentrator system.

2. The apparatus of claim 1, wherein said highly polarizable material has a dielectric constant greater than 4.

3. The apparatus of claim 1, wherein each of said elements is supported by at least one pivot point consisting of the group that is above the element pivot point, gimballed element pivot, and below the element pivot point.

4. The apparatus of claim 1, wherein the ensemble of said optical elements is covered by a transparent sheet.

5. The apparatus of claim 1, wherein said optical elements are contained in a fluid consisting of at least one of the group of vacuum, oil, elevated pressure gas.

6. The apparatus of claim 1, wherein said optical elements are suspended from an external overhead pivot to provide increased mechanical stability.

7. The apparatus of claim 1, wherein an encapsulated polarizable liquid dielectric is rigidly joined next to at least one of said mirrors.

8. A solar concentrator apparatus comprising:
   a) an array of adjustable approximately planar mirrors;
   b) said planar mirrors substantially reflecting at least a portion of the solar input;
   c) each of said mirrors having an external-swivel point;
   d) said external-swivel providing the ability to rotate said mirrors;
   e) said mirrors being in fixed contact with polarizable dielectric material;
   f) linkage to said dielectric material to rotate said mirrors;
   g) said linkage producing a rotational torque;
   h) at least one of said mirrors coupled via said dielectric material to said linkage;
   i) said torque producing an alignment of said mirrors to track and focus light onto a receiver;
   j) said linkage coupled to an electronic control grid;
   k) a receiver for receipt of the concentrated light.

9. The apparatus of claim 8, wherein said linkage is an induced electric dipole.

10. The apparatus of claim 8, wherein said linkage is an electret dipole.

11. The apparatus of claim 8, wherein said mirrors are approximately planar conducting disks rigidly joined to a highly polarizable liquid.

12. A light concentrator, made according to the steps of
a) placing an array of optical elements in the form of a Fresnel reflector in a concentrator array;
b) said elements being rotatable;
c) suspending each of said elements below at least one overhead swivel above the center of mass of each element;
d) supporting each said swivel structure by a bearing above the center of mass of each element;
e) said elements containing highly polarizable material attached to a mirror;
f) dipole coupling said optical elements via the polarizable material to an electronic grid;
g) linkage of said dipoles to said grid;
h) aligning said optical elements to track and focus sunlight onto a receiver by means of said linkage; and
i) receiving said light.

13. The light concentrator of claim 12, wherein said dipole coupling device consists of at least one of the group of induced dipole and permanent dipole.

14. The light concentrator of claim 12, wherein said dipoles are electric dipoles.

15. The light concentrator of claim 12, wherein said polarizable material is an encapsulated liquid joined to said mirror.

16. The light concentrator of claim 12, wherein said polarizable material is a slab with dielectric constant greater than 4, joined to said mirror.

17. The light concentrator of claim 12, wherein said dipole coupling device is an electret.

18. The light concentrator of claim 12, wherein said concentrator has a pyramidal configuration consisting of a Fresnel reflector concentrator at the base and a receiver at the apex.

19. The light concentrator of claim 12, wherein said concentrator has a parabolic trough configuration consisting of a Fresnel reflector concentrator at the base and a receiver at the peak.

* * * * *